United States Patent [19]
Klicpera et al.

[11] Patent Number: 5,637,069
[45] Date of Patent: Jun. 10, 1997

[54] DEVICE FOR METAL CUTTING

[75] Inventors: Udo Klicpera, Pfronten; Bernd Schlieter, Elchingen; Martin Schröppel, Oberkirchberg, all of Germany

[73] Assignee: Kopp Werkzeugmaschinen GmbH, Neu-Ulm, Germany

[21] Appl. No.: 325,315

[22] PCT Filed: Apr. 23, 1993

[86] PCT No.: PCT/DE93/00353

§ 371 Date: Oct. 24, 1994

§ 102(e) Date: Oct. 24, 1994

[87] PCT Pub. No.: WO93/22100

PCT Pub. Date: Nov. 11, 1993

[30] Foreign Application Priority Data

Apr. 24, 1992 [DE] Germany .................. 92 05 554 U

[51] Int. Cl.⁶ ........................................... B23Q 3/157
[52] U.S. Cl. ................................. 483/14; 483/43
[58] Field of Search .............. 483/14, 43; 29/33 P, 29/563, 564

[56] References Cited

U.S. PATENT DOCUMENTS

| | | | |
|---|---|---|---|
| 4,012,830 | 3/1977 | Ewertowski | 483/43 X |
| 4,297,990 | 11/1981 | Yamaguchi et al. | 483/14 |
| 4,344,220 | 8/1982 | Sachot | 483/43 |
| 4,670,965 | 6/1987 | Sato et al. | 483/43 X |
| 4,679,286 | 7/1987 | Momoi et al. | 29/33 P |
| 4,773,152 | 9/1988 | Kitamura | 483/43 X |
| 4,794,686 | 1/1989 | Moore | 29/33 P |
| 4,809,422 | 3/1989 | Kitamura | 483/14 |
| 4,985,971 | 1/1991 | Kitamura | 29/33 P |
| 5,172,464 | 12/1992 | Kitamura et al. | 29/563 |
| 5,205,806 | 4/1993 | Ishida et al. | 29/33 P |
| 5,309,368 | 5/1994 | Chern | 483/14 X |

FOREIGN PATENT DOCUMENTS

| | | | |
|---|---|---|---|
| 2507521 | 12/1982 | France . | |
| 3605470 | 8/1986 | Germany . | |
| 3721610 | 1/1989 | Germany | 483/14 |
| 1484759 | 6/1989 | U.S.S.R. | 29/33 P |
| 1202363 | 8/1970 | United Kingdom | 29/33 P |

Primary Examiner—William R. Briggs
Attorney, Agent, or Firm—Henry M. Feiereisen

[57] ABSTRACT

A device for the cutting metal-machining of one of several workpieces clamped on pallets (WP) and held ready in a device for holding several such pallets (WP) with a control device for timed sequence control, the conveyance of the preselected pallet (WP) bearing a workpiece from the preparation (18) to the machining position (BP), a tool spindle unit changing device for preparing a preselected tool spindle unit (10) in its operative position (AP), a tool changing unit (14, 31) to prepare and take the preselected drilling, milling or grinding tool (WZ) from a tool magazine (14) into the sleeve (13) of the tool spindle unit (10) and a device in the form of a pallet magazine (PM) to take at least two workpiece pallets (WP) which has at least one preparation position (18) arranged in the vertical plane and in which the clamping position (17) is horizontal, and a conveyor (ZU) for bringing at least one loaded pallet (WP) from the preparation (18) to the machining position (BP) of the workpiece carrier (WT) having a conveyor path (20) for the pallet (WP) which can be connected to the preparation position (18) on the one hand and the machining position (BP) of the workpiece carrier (WT) on the other hand and can pivot through 180°.

23 Claims, 9 Drawing Sheets

DEVICE FOR METAL CUTTING

The invention refers to a device for metal cutting one of more workpieces mounted on workpiece pallets and readied for use in a receiving apparatus for several workpiece pallets for transport into the machining position.

Devices of this type were already proposed, which include a control unit for clocked sequence control of several machine operations partially at the same time or also partially in succession, by feeding a preselected workpiece pallet, which is loaded with a workpiece from a pickup site to the machining position, and by inserting a preselected machining tool by means of a tool changing apparatus into the sleeve of the tool spindle unit.

Tool magazine and changing device ensure an automatic tool supply suited to the respective machining task.

Thereby it is required to design the tool carrier of the working machine and its clamping plate for receiving the workpiece pallet accurate to dimension.

Charging of the workpiece pallet with workplaces selected for machining is executed at a pallet assembly site. There, the workpieces are adjusted accurate to dimension by a clamping fixture, to which the workpiece pallet are mounted and then transported to the pickup site.

At the time of the workpiece change, the workpiece pallet is transported by hand or by means of a loading unit, e.g. a grab or a hoist—when heavy workpieces are concerned—into the machining position onto the workpiece carrier of the working machine from which the previously machined workpiece is released and removed.

Further, feeding devices, which are movable along guide tracks, are known for use with workpiece pallets. Moreover, it has already been proposed to arrange several pickup sites for workpiece pallets, loaded with workpieces, on a common assembly which may be rotatable in a carousel-like manner or may be similar to a conveyer path. At least one of the existing loading sites of the assembly must be lockable in a position in which the change of the workpiece pallet can be executed in such a manner that the machined workpiece is removed from the assembly and a still unfinished workpiece mounted onto the workpiece pallet occupies the freed loading site.

There is always the need with regard to such assemblies on working machines to execute the individual functions and changing operations as rapidly and simply as possible in order to keep the mechanical and control parts to a minimum. Starting out from these realities, a significant simplification is effected, in accordance with a teaching of the invention, when providing a receiving apparatus formed as pallet magazine for at least two workpiece pallets with at least one pickup site in a vertical plane and with the charging and clamping site being designed horizontally.

When the pickup site of the pallets for the workpieces being fed for machining is arranged according to the invention in a vertical plane, then the workpiece pallets can be transferred in this vertical plane directly, i.e. without additional swinging or tilting motions into the machining position and secured to the workpiece carrier. This is in particular advantageous when the workpiece is formed as a horizontal-axial body of rotation and the tool carrier includes a pivot drive; then, the body of rotation can then additionally be supported in a fixed stay and/or in a tailstock. Further, the design with a horizontally aligned loading and clamping site is advantageous, in particular as far as heavy workpieces are concerned which possibly is required to be fed by a conveyor. Thus, the clamping and adjusting by means of a readied apparatus upon the workpiece pallet can be executed in a simple manner without significant manual strain or manipulations.

Of great relevance appears the provision of the further embodiment according to the invention of a feeder for at least one loaded workpiece pallet from the pickup site to the machining position of the workpiece carrier, which feeder includes for the workpiece pallet a conveying path connectable to the pickup site, on the one hand, and to the machining position of the workpiece carrier, on the other hand. In accordance with a preferred embodiment, the feeder is formed as a linear, i.e. rectilinear conveying path, and swingably supported by 180°.

In accordance with further essential features of the invention, the pallet magazine, having at least two loading sites for workpiece pallets, is swingable about a horizontal axis and lockable in the number of swing positions in correspondence to the number of loading sites, and further, it is in particular advantageous when the loading sites of the pallet magazine and/or the workpiece pallets and the feeder as well as the workpiece carrier are provided with mounting elements by which the workpiece pallets are adjustably secured onto the loading sites with regard to the feeder and the workpiece carrier. This ensures that the workpiece pallets are securely connected in each position of movement of the pallet magazine and/or the feeder with their associated loading or transport site.

Thereby, it is essential that the locking can be activated and released without any loss of time. This is made possible by providing the loading sites with guide rails in correspondence to the standardized workpiece pallets and with clamping claws which are pressable by means of spring pressure action against the pallet guides. The precise position of the pallets is ensured in a manner known per se through stops or through complementary form fitting adjusting elements.

In order to further guarantee this assurance, provisions must be made to allow release of this clamping force only when the respective workpiece pallet is to be removed or replaced from its respective site. Thus, the device is designed in such a manner that the clamping of the standardized workpiece pallets in the guide grooves of the loading sites is releasable only in the swinging position of the feeder in which the pallet change is possible by means of a ram which is driven in opposition to the spring pressure by the feeder-pivot drive and locked therewith.

According to a further feature, it is furthermore advantageous to provide the standardized workpiece pallets with recesses and the conveying path with engagement elements which engage the recesses for grasping and further transport of the workpiece pallets which are readied at the pickup site in the pallet magazine and in the machining position of the workpiece carrier. These standardized workpiece pallets correspond essentially to DIN standards; they are, however, provided on two side edges with opposing lugs in which the recesses are formed for engagement of the engagement elements. The simplest embodiment includes that in vertical position of the workpiece pallet, the lugs arranged on both sides in horizontal direction are provided with vertical grooves for engagement of engagement elements in form of engagement bolts.

An advantageous embodiment may include as an essential feature of the invention to provide the conveying path of the feeder as chain conveyor, with the arrangement being made such that the driving strand of the chain conveyor is connected to the chain conveyor driving motor, with a drive shaft being arranged in the horizontal pivot axis of the feeder and supporting a driving pinion which engages the conveyor chain.

In accordance with a variation of this embodiment, the conveying path may also be made of two parallel threaded spindles with threaded nuts which include engagement elements engaging recesses of the workpiece pallets, whereby the threaded spindles are provided with right-handed thread and left-handed thread and/or driven in opposite direction.

In accordance with another preferred embodiment, the conveying path is formed by two racks moving in opposition to each other and including engagement elements on both its extendible ends, with the engagement elements being formed on the side of the pickup site and the side of the workpiece carrier for simultaneous bilateral engagement into the recesses of the workpiece pallets. This embodiment appears particularly simple and operationally reliable.

In accordance with a further variation of the invention, it is also possible to form the engagement elements for bilateral and simultaneous engagement in the recesses of the workpiece pallets on the side of the pickup site side and on the side of the workpiece carrier side, or, furthermore, to provide the conveying path in form of two oppposingly driven, telescopic rods, with their bilateral extendible ends being provided with engagement elements for simultaneous, bilateral engagement in the recesses of the workpiece pallets at the side of the pickup site and at the side of the workpiece carrier.

In the embodiment of the conveying path with threaded spindles, racks or telescopic rods, the engagement elements may also be formed as steerable or disengageable, hook-like engagement catches, which engage the grooves or like recesses in the bilateral lugs of the workpiece pallet.

Within the scope of the invention is also the further design of the device in form of a highly automated manufacturing center through combination with an apparatus for changing the tools between the tool magazine and the tool spindle or tool spindle unit situated in the working position, as well as the tool spindle unit from its stand-by position into the working position.

The first mentioned apparatus includes a power-actuatable tongs-type grab that is shiftable and rotatable as well swingable and includes grab jaws which can open and close and can be aligned with the respective tool removal axis and the spindle axis.

The tool spindle unit changing apparatus according to the invention is provided with a vertical column console arranged on a common machine stand as well as with a tool spindle unit operatively connected detachably and exchangeable with the column console and a (first) movement path underneath the tool spindle unit which is operatively connected with the column console for directional displacement of the tool spindle unit detached from the column console from its working position into a stand-by position which is spaced from the column console.

This solution includes a device part which combines the common tool stand unit with the device part for rapid automated changing of the tools and which adds a further dimension with regard to selection of sequentially used tools. There is no need to select the tools on the basis of available tool holder or spindle of the tool spindle but all needed machining operations can be executed with different tools in random sequence in a same workpiece clamping fixtures regardless of the tool size and its taper or shank size.

The movement path may be designed as rail track, and the tool spindle units may be provided with rollers for guidance thereon. Moreover, it is possible to arrange special rolling containers which travel on the rail track for receiving tool spindle units and for transporting, e.g. lifting, them into a stand-by position. Also, the movement path may be designed as suspension path by which the tool spindle units are lowered into their stand-by position.

In accordance with a modification thereof, the movement path may be formed by a belt conveyor or plate conveyor on which the tool spindle units are lowered and lifted therefrom in the area stand-by position or are moved to the side.

In accordance with a preferred embodiment, the movement path is a railroad-like rail track on which the tool spindle units easily travel via sliding means or rollers, with the movement path including in accordance with a further proposal an elevatable and lowerable section beneath the working position of the tool spindle unit which is arranged on the column console. This section is lifted below the tool spindle unit for receiving same so that the connection to the column console can be separated and the tool spindle unit rests on the movement path or on a rolling container traveling thereon. In accordance with a variation of the invention, the column console or its adapter element for the detachable connection with the tool spindle unit may be lowerable from the respective working position so that the tool spindle unit being replaced can be lowered onto the movement path and advanced from there.

Depending on the selected configuration of the movement path and its characteristics—as described above for example as conveyer or as suspension track—the movement path is sufficient for receiving and transporting and feeding the tool spindle units being respectively replaced because they can be transferred in a stand-by position by other additional lifting tools or transfer assemblies.

In accordance with a preferred embodiment, the arrangement is provided in such a manner that the (first) movement path has on its end a branch or a rotating disk which is connected to a further (second) movement path designed as stand-by position for a plurality of tool spindle units or leading thereto, with a particularly advantageous arrangement being created in such a manner that the first movement path is rectilinear, and the second movement path which is connected to the end thereof at a right angle at both sides is designed as stand-by position for a plurality of tool spindle units. In this manner, the tool spindle units with different tool receptacles or spindles and provided in stand-by position become accessible at all times for differently sized tools; then, it is also possible to replace the tool spindles in case of need or to provide them with particular holding fixtures for special tools.

In accordance with further advantageous particulars of the device according to the invention, the tool spindle units are provided with a synchronous motor arranged directly on the spindle shaft and are speed-controlled by a frequency converter. Moreover, an exchange of the tool spindle units is further especially simplified when, according to a further feature, the adapter element of the column console and the attachment surface of the tool spindle units are provided with remote-controlled, pressure fluid operated fitting devices and armature devices and quick connections for the current transmissions.

In a machining center designed in accordance with the invention, the tool magazine, the tool changing unit and the changing device for the tool spindle units ensure an automatic, essentially freely shapeable tool supply in accordance with the respective machining tasks; thus, the basis for high automation stages is established.

The following exemplified embodiment of the invention shows further advantageous features and particulars which are described and explained in more detail with reference to the illustration in the drawings, in which

FIG. 13 shows the feeder with a telescopic conveyer;

Figure 1:
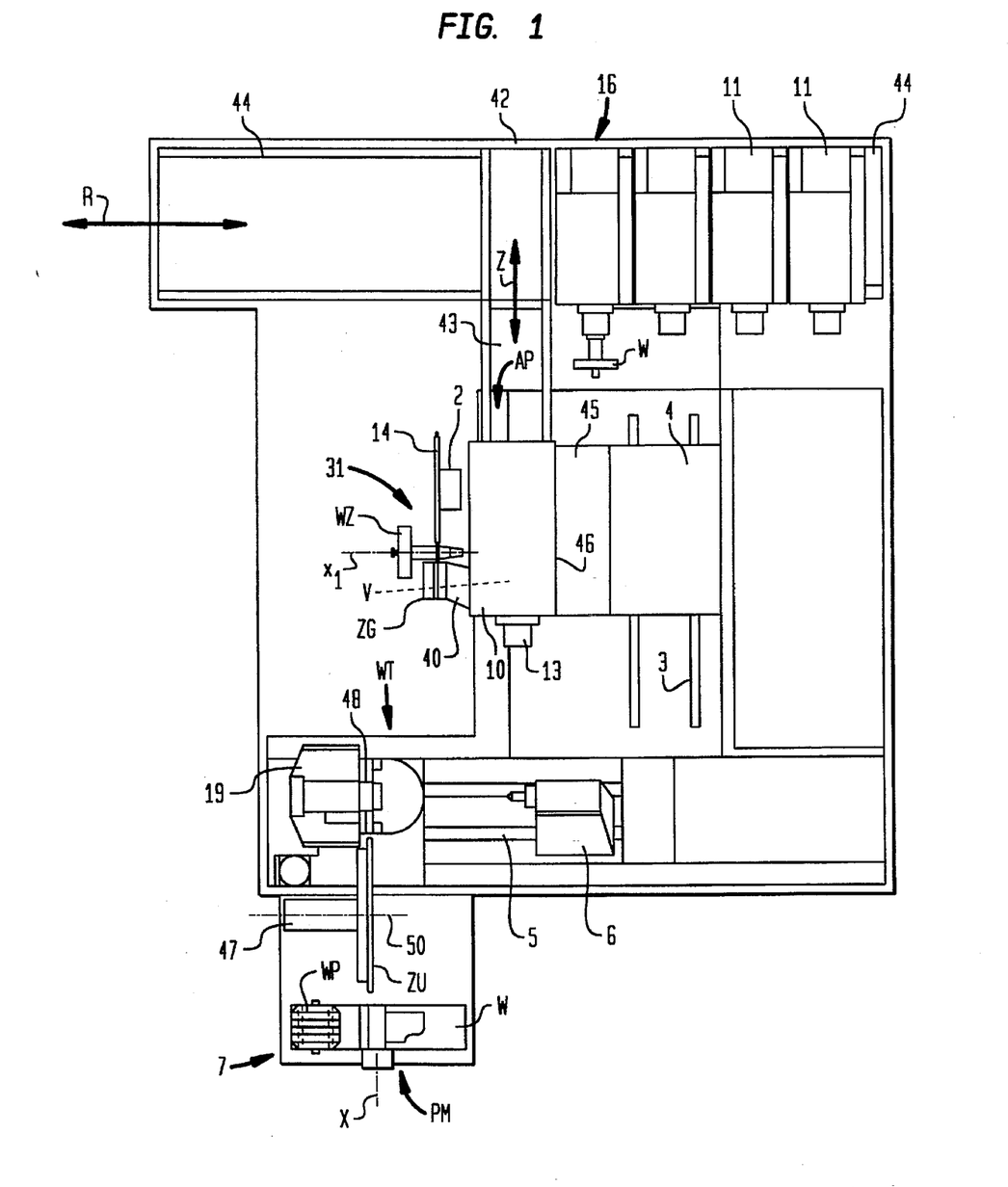
FIG. 1 is a schematic overall top view of a highly automated manufacturing center, encompassing the concepts according to the invention.

FIG. 1 shows a highly automated machining center created by the device according to the invention and united on a machine stand 1. This machining center includes a tool magazine console 2 with the tool magazine 14 and a column guide 3 on which the column console 4 travels. Further provided is a tailstock guiding mechanism 5 for enabling a traveling of the tailstock 6. 7 designates an automatic pallet transfer mechanism.

Provided on the column console 4 is a vertically movable adapter element 45 with the attachment surface 46 for connection of the tools spindle unit 10.

FIG. 1 further shows how the tool spindle unit 11 provided in stand-by position 16 of the tool spindle unit changing device slides on a guiding path or movement path 44 extending in transverse direction R to the spindle axis Z and is transferable from a changing position 42 via a branch or rotating disk to a working position AP along a guiding path 43 extending coaxially to the spindle axis Z. Traveling therealong is the tool spindle unit 10 or 11 until reaching the column console 4 for connection to the attachment surface 46. This arrangement allows a random exchange of the tool spindle units 10, 11.

The guiding path 43 is a railroad-like rail track on which the tool spindle units 10 easily travel via sliding means or rollers, and includes a an elevatable and lowerable section 43a (FIGS. 1c, 1d) situated beneath the working position AP of the tool spindle unit 10 in engagement with the column console 4 via a dovetail joint 45a. This section 43a is lifted below the tool spindle unit 10 for receiving same so that the connection to the column console 4 can be separated and the tool spindle unit 10 rests on the guiding path 43. In accordance with a variation of the invention, the column console 4 together with its adapter element 45 may be lowerable relative to its base 4a running on the column guide 3 for disengagement from the tool spindle unit 10 so that the tool spindle unit being replaced can be lowered onto the section 43a, as shown in FIG. 1c.

The tool spindle units 10, 11 are provided with a synchronous motor arranged directly on the spindle shaft and are speed-controlled by a frequency converter. The frequency generator for the synchronous motor is arranged in the area of the adapter element 45 of the column console 4 for detachable connection with the tool spindle unit 10 situated in working position AP in or on the column console 4. The adapter element 45 of the column console 4 and the attachment surfaces 46 of the tool spindle units 10 are provided with remote-controlled pressure fluid operated fitting and armature devices and rapid connections for the current transmission.

The tools WZ are held in the tool changing unit 14 and inserted in the spindle 13 by a tongs-type grab ZG of the tool changing unit 31, second to the console 4 by mounting 40.

Figure 1A:
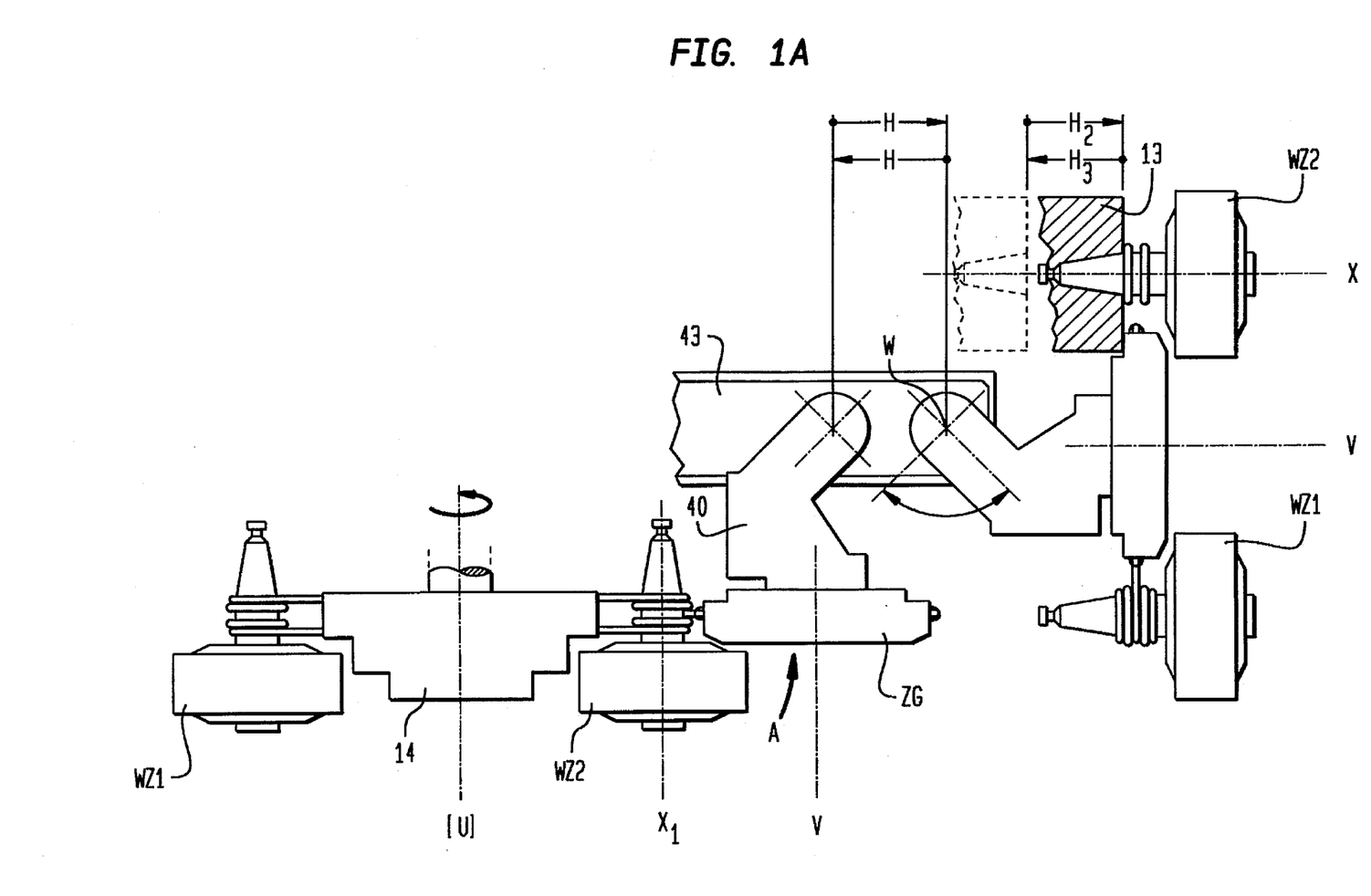
FIG. 1a is a schematic illustration of a tool changing device.
Figure 1B:
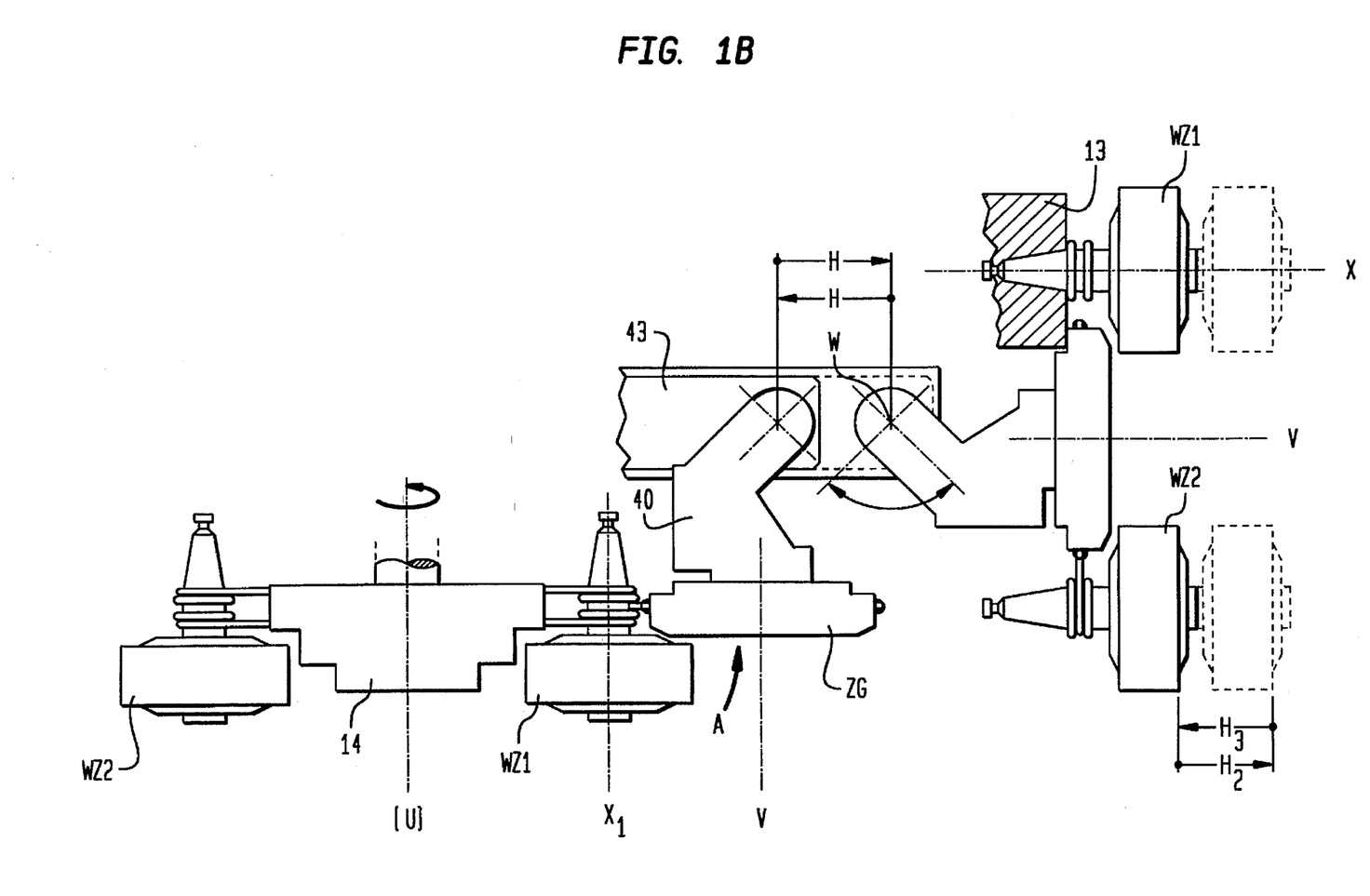
FIG. 1b is the illustration according to FIG. 1a in a modified configuration.
Figure 1C:
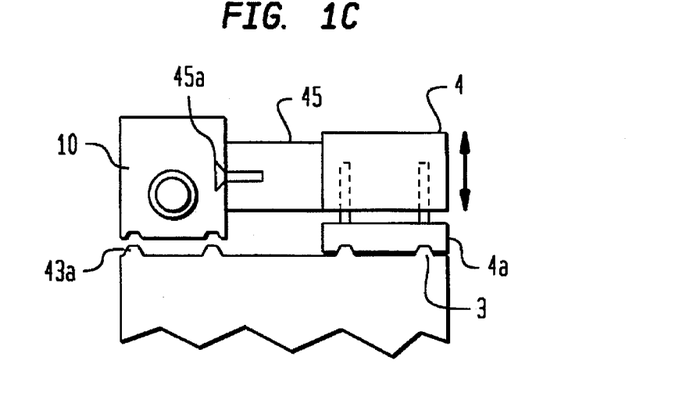
FIG. 1c illustrates a plan view of the column console of the device of FIG. 1 in engagement with a tool spindle unit.
Figure 1D:
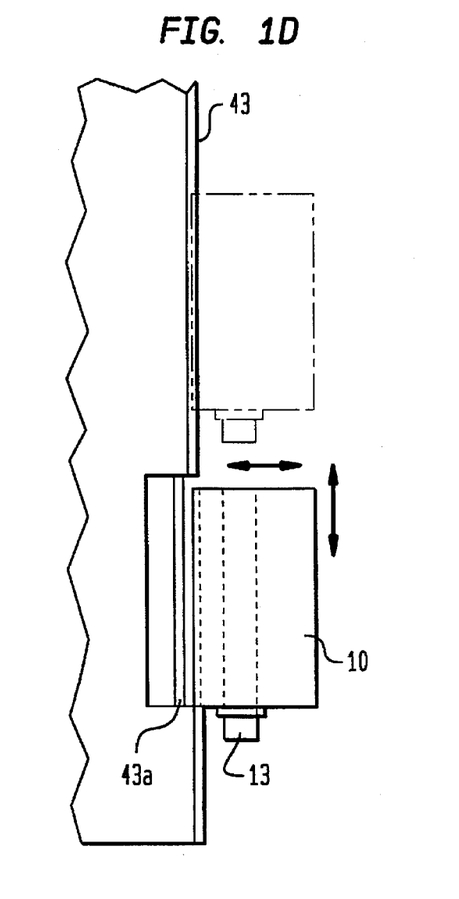
FIG. 1d is a side view thereof.

FIGS. 1a, 1b illustrate the tool change with the tool change unit according to the invention. The structure of the tool change unit includes an arrangement of the tongs-type grab ZG which is pivotable about a horizontal axis V on a console 40 which is rotatable by 90° about a vertical axis W by means of a power drive and is moved along a guiding path 41 in direction parallel to the tool spindle axis Z about a stroke step H into its changing position for grasping the tool W. Only one stroke in direction of the spindle axis Z is necessary in order to remove the tool grasped by the tongs ZG from the spindle 13. Two solutions are illustrated in FIGS. 1a and 1b. According to FIG. 1a, the column console executes a return stroke H2 and a forward stroke H3 after pivoting the tongs-type grab by 180° in order to insert the exchanged tool into the spindle 13.

Figure 2:
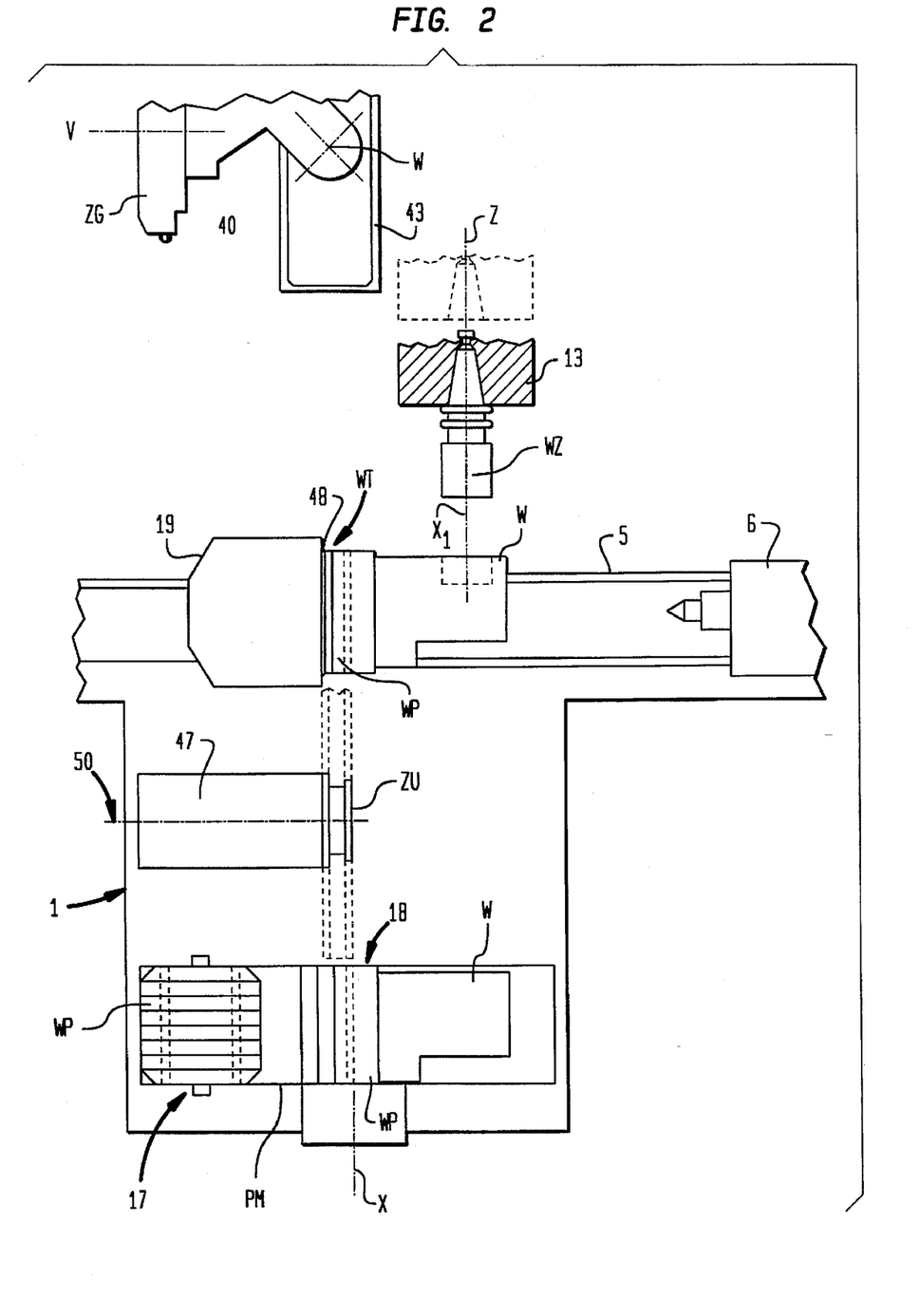
FIG. 2 is a schematic top view of the workpiece pallet changing unit.
Figure 3:
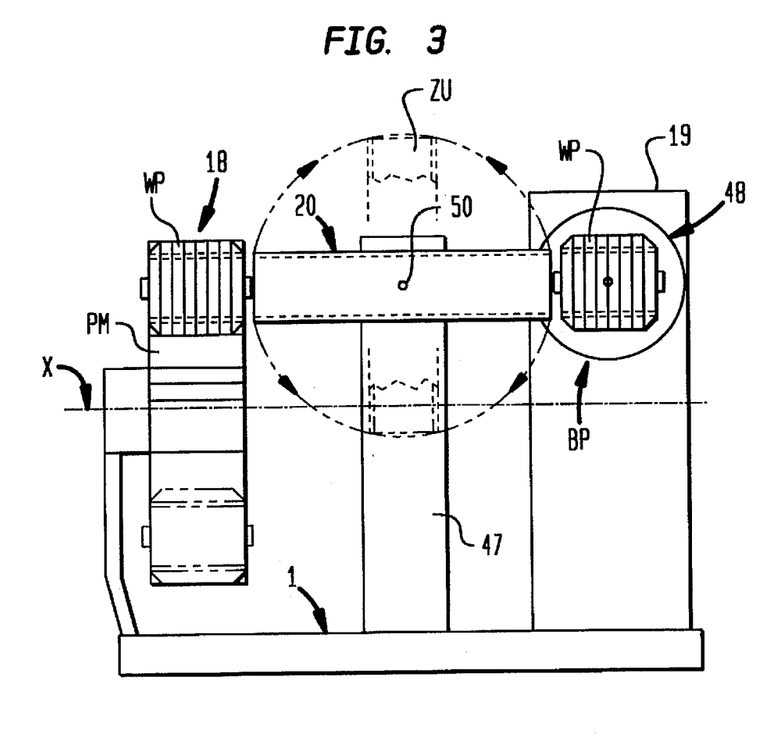
FIG. 3 is an illustration according to FIG. 2 in viewing direction onto the feeder pivot axis and the spindle axis of the tool spindle unit.

The changing of a tool WZ with a same or differently sized shank or taper is provided according to FIG. 1b in a manner that in the initial position A of the double tongs-type grab ZG the first tongs Z1 grasps the first tool WZ1 situated in the tool magazine 14 and that through shifting about the stroke step H and turning of the console 40 by 90° about the vertical axis W the second tongs Z2 grasps a second tool WZ2 situated in the spindle and pulled out from the spindle 13 by a second stroke step H2. Thereafter, the first tool WZ1 is positioned before the spindle 13 through pivoting of the tongs-type grab ZG by 180° about the horizontal axis V and inserted in the spindle 13 through executing a—third— reversing stroke step H3. Through turning back the console 40 by 90° about the vertical axis W and shifting about the base stroke step H, the tongs-type grab ZG travels into the initial position A in which the second tool WZ2 is placed into the tool magazine 14. As shown in FIG. 2, the feeder ZU can occupy a horizontal (illustrated in dashed line) and a vertical position by being swingable about the pivot axis 50 which is arranged with the pivot drive in the frame 47. In the horizontal position, the conveying path 20 which is not shown in detail is connected on both sides with the guide rails FL of the pallet guides PF of the workpiece carrier WT and the pallet magazine PM, as is also shown in FIG. 3. FIG. 2 further illustrates the clamping position 17 for holding the work piece pallet WP in a horizontal position, and moreover the pickup position 18 in which the workpiece pallet WP stands vertically for transfer to the machining position and is held in the pallet guide PF which is in alignment with the conveying path 20 of the feeder.

Figure 4:
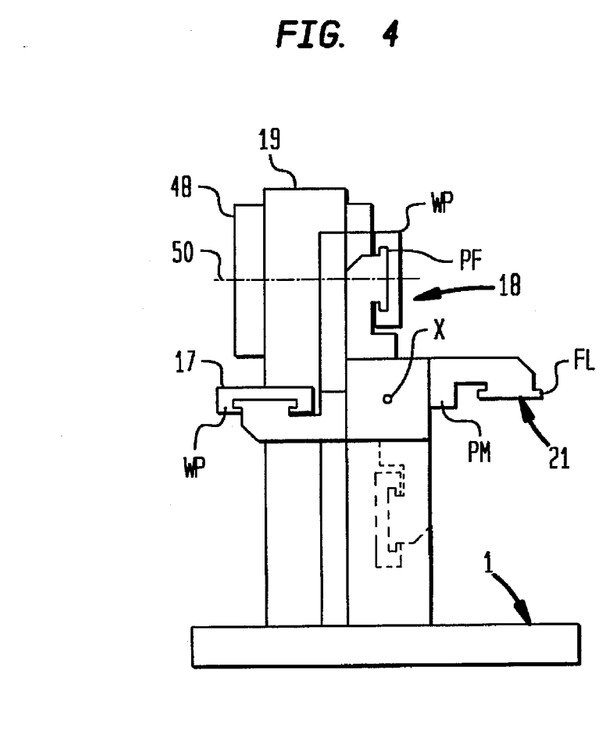
FIG. 4 is an illustration according to FIG. 3 in viewing direction of the horizontal axis of the pallet magazine.

FIGS. 3 and 4 show further details of the cooperating components, that is the pallet magazine pivotable about the horizontal axis X, and formed with four loading sites 21 for receiving a workpiece pallet WP at the clamping position 17 and transporting the workpiece pallet WP to the pick-up position 18 for transfer to the machining position BP by the feeder ZU 19 designates the tool carrier unit which is provided in the exemplified embodiment with a pivot drive 48 so that an axially centered workpiece can be machined in a machining position BP while being rotated. The feeder ZU with the conveying path 20 is swingably supported about the pivot axis 50 on the frame 47.

Figure 5:
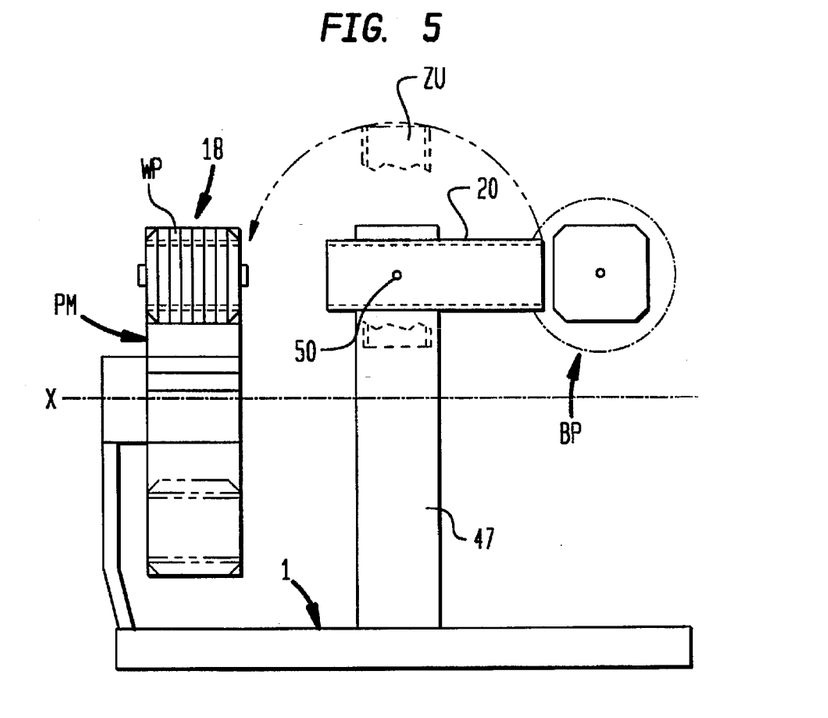
FIG. 5 is a modified illustration according to FIG. 3.

FIG. 5 corresponds essentially to the embodiment according to FIG. 3, with the difference being that the feeder ZU has a longer and a shorter arm. This embodiment is suitable when the (in FIGS. 3, 4, and 5) not shown tailstock guiding mechanism 5 is situated too high to enable a passage of the feeder. In this case, the feeder ZU cannot travel a full circle of 360° or twice 180° so that the tool change requires two separate successive operations. At first, the workpiece pallet WP must be picked up from the tool carrier WT by the feeder ZU—as shown in dashed line—and transported through swinging about 180°—see arrow direction—to a free stand-by position 16 of the pallet magazine PM, and placed thereon. Thereafter, the pallet magazine swings about 90° or 180° and a loaded workpiece pallet WP is moved to the stand-by position 16 for removal by the conveyor 20 of the feeder ZU and transfer to the workpiece carrier WT through swinging about 180°.

Figure 6:
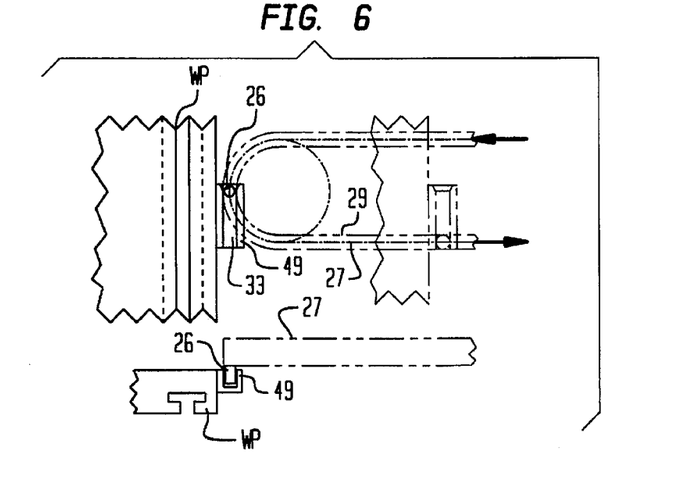
FIG. 6 shows the feeder with chain conveyer.

FIG. 6 illustrates a side of the feeder ZU with the chain conveyor 27 in which the conveyor chain 29 is guided via a driving pinion 30. The conveyor chain 29 is equipped with an engagement element 26—formed as pin—which—as shown—engages the recess 33 on the lateral lug 49 of the workpiece pallet WP for conveying the workpiece pallet WP into the dashed position.

Figure 7:
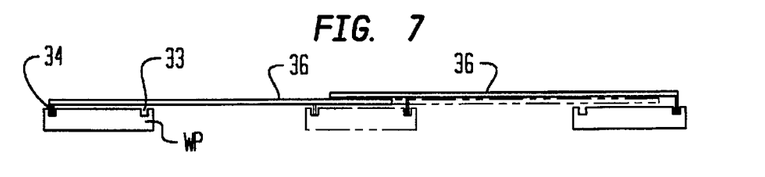
FIG. 7 shows the feeder with a rack conveyer.
Figures 8, 9:
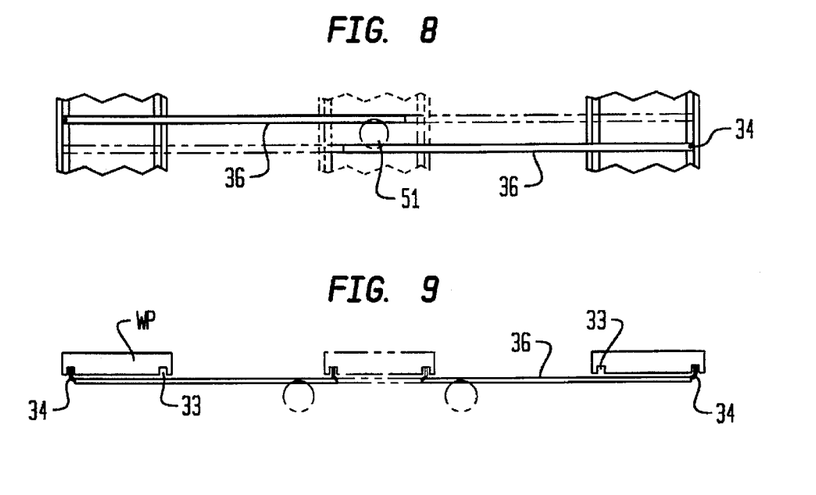
FIG. 8 shows a top view of the feeder with a rack conveyer.
FIG. 9 shows the feeder with a modified rack conveyer.

FIGS. 7 and 8 show an embodiment of the feeder ZU with a rack conveyor having essentially the two racks 36 which are driven by a common or by two separate driving pinions 51. The rack strokes are defined in such a manner that the engagement elements 34 transport the workpiece pallet WP to the middle and then are disengaged or engaged in order to enable the subsequent sequence stroke into the respectively other end position.

Figure 10:
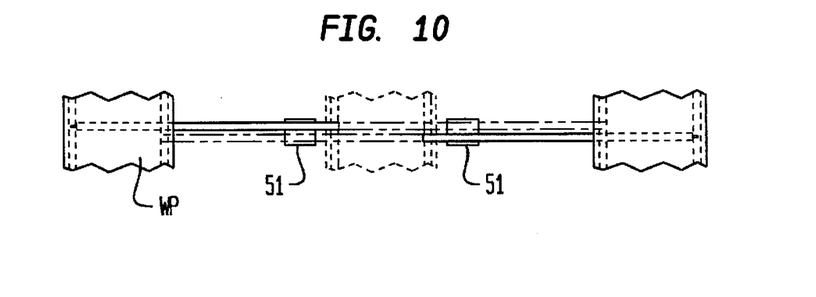
FIG. 10 is a top view of the feeder with a modified rack conveyer.

A modified rack design of the conveying path 20 of the feeder ZU is shown in FIGS. 9 and 10. There, each of the racks 36 is driven by two separate driving pinions 51 which are offset to the center for space reasons. Thus, the racks 36 can be moved closer together. They are also provided with the engagement elements 34 which engage in recesses 33 of the workpiece pallets WP.

Figure 11:
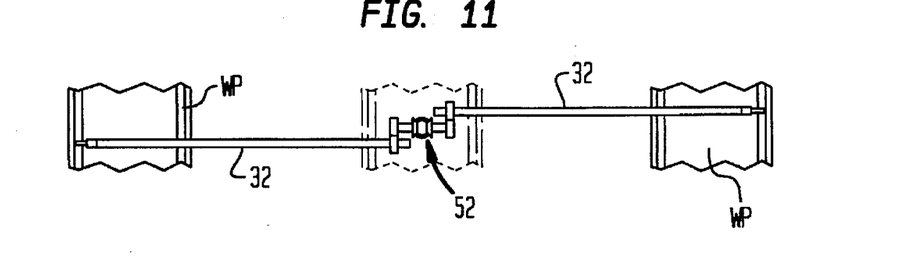
FIG. 11 shows the feeder with a threaded spindle conveyer.
Figure 12:
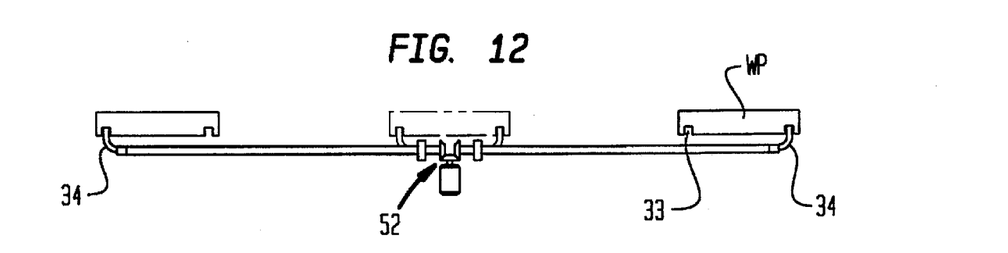
FIG. 12 is a top view of the feeder according to FIG. 11.

FIGS. 11 and 12 show a conveyor design of the feeder ZU in form of threaded spindles 32 which are driven by a central gearing 52 and include at their ends engagements elements 34 by which they are initially transported within the respective recesses 33 of the workpiece pallets to the center by one rack and then taken over by the other rack for executing the remaining stroke.

Figure 13:
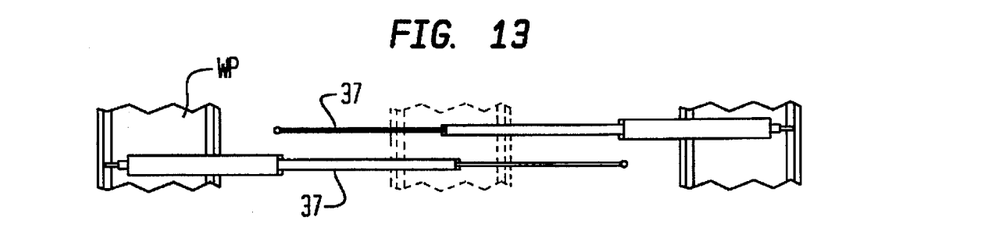
Figure 14:
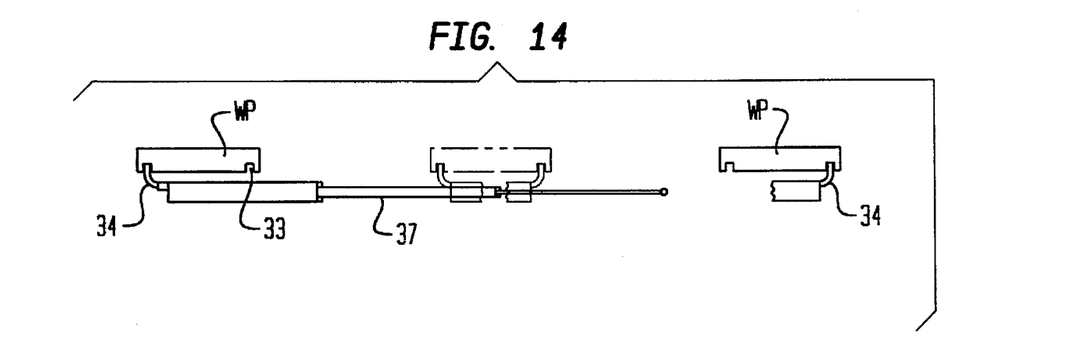
FIG. 14 is a top view of the feeder according to FIG. 13.

Finally, FIGS. 13 and 14 show a schematic exemplified embodiment of a design with telescopic rods 37. This embodiment has the advantage of little demand for space because the actual driving component is arranged outside of the device in form of a pressure fluid generator and pressure fluid control unit and requires only flexible tubes for connection to the telescopic rods 37.

Figure 15:
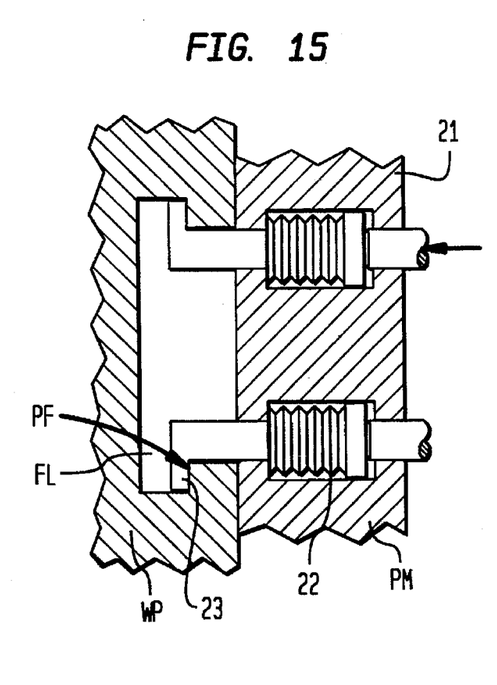
FIG. 15 shows the clamping unit for the workpiece pallets.
Figure 16:
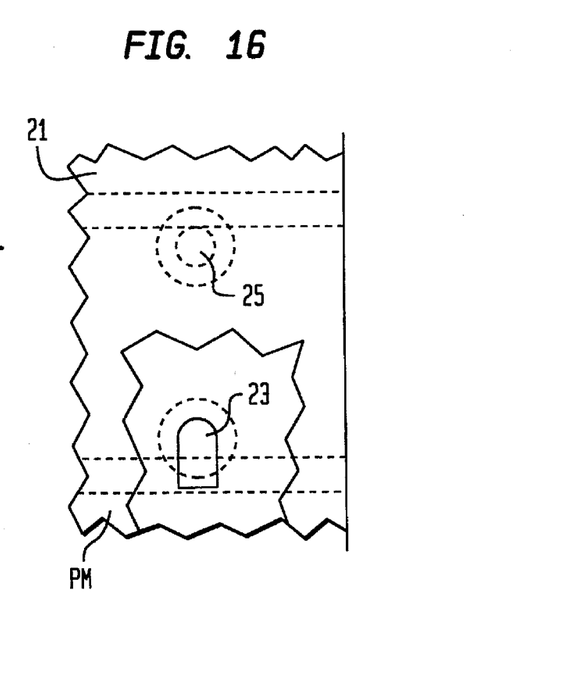
FIG. 16 is a partially sectional view of the clamping unit according to FIG. 13.

FIGS. 15 and 16 show an example as to how the clamping claws 23 are pressed under the action of the compression springs 22—here designed as disk springs—onto the surfaces of the pallet guides PF. To release the clamping action, rams 25 are provided which are driven in a not shown manner by means of lever action through the swinging motion of the feeder ZU such that they permit in each changing position the release of the workpiece pallet to be changed.

We claim:

1. Device for metal cutting of one of several workpieces (W) clamped on workpiece pallets (WP) and readied in a receiving unit for several workpiece pallets (WP) for transport into a machining position (BP), comprising
   a. a control unit for clocked sequence control,
   b. a pallet magazine (PM) containing at least two workpiece pallets (WP) and including
      at least two loading sites (21) for transporting a workpiece pallet (WP) from a clamping position in which the workpiece pallet is in horizontal disposition to a pickup position (18) in which the workpiece pallet is in vertical disposition,
      wherein the pallet magazine (PM) is swingable about a horizontal axis (X) and securable in a number of swing positions corresponding to a number of loading sites (21),
   c. a feeder (ZU) for transporting the workpiece pallet from the pickup position (18) to a machining position (BP) said feeder (ZU) being swingably supported about a horizontal axis (50) for movement by 180° and forming a conveying path (20) for the workpiece pallet (WP) between the pickup position and the machining position (BP),
   d. a tool spindle unit changing device for preparing a preselected tool spindle unit (10) in its working position (AP), said tool spindle unit changing device including
      d1. a vertical column console (4) arranged on a common column machine stand (1) and
      d2. a tool spindle unit (10) detachably and exchangeably connected to the column console,
      wherein the tool spindle unit (10) is movable along a guiding path between a working position (AP) in which the tool spindle unit (10) is operatively connected with the column console (4) and a stand-by position (16), as well as
   e. a tool changing unit (14, 31) for preparing and feeding the preselected drilling, milling or grinding tool (WZ) from a tool magazine (14) into the sleeve (13) of said preselected tool spindle unit (10).

2. Device according to claim 1 wherein the tool spindle unit changing device has means for placement of a preselected tool spindle unit (10) in its working position (AP), and including
   a tool changing unit (14, 31) for preparing and feeding the preselected drilling, milling or grinding tool (WZ) from a tool magazine (14) into the sleeve (13) of said preselected tool spindle unit (10),
   wherein the tools (WZ) held in the tool magazine (14) in a horizontal axis are removable by means by a double tongs-type grab (ZG) which is pivotable about a horizontal axis (v) and arranged on a console (4) rotatable about a vertical axis (w) by means of a power drive and is movable back and forth in direction parallel to the tool receiving axis and spindle axis (Z) along a guiding path about at least one stroke step.

3. Device according to the claim 1 wherein the loading sites (21) of the pallet magazine (PM) and the workpiece pallets (WP) and the feeder (ZU) as well as the workpiece carrier (WT) are provided with mounting elements (39) by which the workpiece pallets (WP) are adjustably secured on the loading sites (21), the feeder (ZU) and the workpiece carrier (WT).

4. Device according to claim 3, wherein the loading sites (21) are provided with guide rails (FL) in correspondence to the standardized workpiece pallets (WP) and with clamping claws which are pressable onto the pallet guide (PF) by the action of a spring force (22).

5. Device according to claim 1 wherein in the initial position of the double tongs-type grab (ZG) a first tool (WZ) situated in the tool magazine (14) is grasped by the first tongs (Z1) and through movement by a stroke step and turning of the console (40) by 90° about the vertical axis (w) a second tool (WZ) situated in the sleeve 13 of the tool spindle unit (10) is grasped by the second tongs (Z2) and pulled out through a return stroke step (H2) from the sleeve (13), and subsequently through pivoting of the tongs-type grab (ZG) by 180° about the horizontal axis (v) the first tool (WZ) is positioned before the sleeve (13) and inserted in the sleeve (13) through execution of a—third—reversing stroke step, and thereafter through turning back of the console (40) by 90° about the vertical axis (w) and traveling about the reversing stroke step is movable into the initial position in which the second tool (WZ) is insertable in the tool magazine (14).

6. Device according to claim 1 wherein in the initial position of the tongs-type grab (ZG) a first tool (WZ) situated in the tool magazine (14) is grasped by the first tongs (Z1) and through traveling about a first stroke step and pivoting by 90° about the horizontal axis (v) as well as turning of the console (40) by 90° about the vertical axis (w) as well as returning of the tongs-type grab (ZG) by 90° about the horizontal axis (v) a second tool (WZ) situated in the sleeve (13) of the tool spindle unit (10) is grasped by the second tongs (Z2) and pulled out by a second stroke step from the sleeve (13), and subsequently through pivoting of the tongs-type grab (ZG) by 180° about the horizontal axis (v) the first tool (WZ) is positioned before the sleeve (13) and inserted in the sleeve (13) through execution of a—third—reversing stroke step, and thereafter is moved through turning back of the console (40) by 90° about the vertical axis (w) and traveling by the reversing stroke step into the initial position in which the second tool (WZ) is insertable in the tool magazine (14).

7. Device according to claim 4, wherein the standardized workpiece pallets (WP) are provided with recesses (33) which are engaged by engagement elements (26) of the conveying path (20) for grasping and further transport of the workpiece pallets (WP) readied at the pickup site (18) of the pallet magazine (PM) and in the machining position (BP) of the workpiece carrier (WT).

8. Device according to the claim 7 wherein the conveying path (20) is provided in form of a chain conveyor (27).

9. Device according to claim 8, wherein the driving strand of the chain conveyor (27) is connected to the chain conveyor driving motor (28), with a drive shaft (38) being arranged in the horizontal pivot axis (50) of the feeder (ZU) and a driving pinion (30) secured thereto and engaging the conveyor chain (29).

10. Device according to the claim 7 wherein the conveying path (20) includes two parallel threaded spindles (32), the threaded nuts (35) of which including engagement elements (34) engaging in recesses (33) of the workpiece pallets (WP).

11. Device according to claim 10, wherein the threaded spindles (32) are provided with right-handed thread and left-handed thread and/or driven in opposition.

12. Device according to claim 7 wherein the conveying path (20) is formed by two racks (46) which are driven in opposite direction and provided on their bilateral, extendible ends with engagements elements (34) for bilateral simultaneous engagement in the recesses (33) of the workpiece pallets (WP) on the side of the pickup site (18) and the side of the workpiece carrier (WT).

13. Device according to claim 7 wherein the conveying path (20) is formed by two telescopic rods (37) driven in opposition to each other and having on both sides extendible ends provided with engagement elements(34) for simultaneous bilateral engagement into the recesses (33) of the workpiece pallets (WP) on the side of the pickup site (18) and the side of the workpiece carrier (WT).

14. Device according to claim 1 wherein in the initial position of the double tongs-type grab (ZG) a first tool (WZ) situated in the tool magazine (14) is grasped by the first tongs (Z1) and through movement by a stroke step and turning of the console (40) by 90° about the vertical axis (w) a second tool (WZ) situated in the sleeve (13) of the tool spindle unit (10) is grasped by means of the second tongs (Z2) and pulled out from the sleeve (13) through a return stroke step of the tool spindle unit (10) and that subsequently the first tool (WZ) is positionable before the sleeve (13) through pivoting of the tongs-type grab (ZG) by 180° about the horizontal axis (v) and insertable into the sleeve through executing a—further—reversing return stroke step (R) and subsequently movable through turning back the console (40) by 90° about the vertical axis (w) and travel about the reversing stroke step (H2) into the initial position in which the second tool (WZ) is insertable in the tool magazine (14).

15. Device according to claim 1 wherein the first guiding path (43) is formed with an offset section positioned underneath the tool spindle unit (10) in working position (AP) and movable relative to the tool spindle unit (10) for effecting a disengagement of the tool spindle unit (10) from the column console (4).

16. Device according to claim 1 and further comprising means for lowering the column console (4) or its adapter element (45) for effecting a disengagement thereof from the tool spindle unit (10) in the respective working position (AP).

17. Device according to claim 1 and further comprising connection means for linking the first guiding (43) to a second movement path (44) forming a stand-by position (16) for a number of tool spindle units (10, 11).

18. Device according to claim 17 wherein the first guiding or movement path (43) is rectilinear and the second movement path (44), which is connected on both sides at a right angle to the end of the first movement path (43), forms a stand-by position (16) for a plurality of tool spindle units (10, 11).

19. Device according to claim 1 wherein the tool spindle units (10) are provided with a synchronous motor arranged directly on the spindle shaft.

20. Device according to claim 19 wherein the frequency generator for the synchronous motor is arranged in the area of the adapter element (45) of the column console (4) for detachable connection with the tool spindle unit (10) situated in working position (AP) in or on the column console (4).

21. Device according to claim 20 wherein the adapter element (45) of the column console (4) and the attachment surfaces (46) of the tool spindle units (10) are provided with remote-controlled pressure fluid operated fitting and armature devices and rapid connections for the current transmission.

22. Device according to claim 21, wherein the adapter element (45) are movable upwardly and downwardly relative to the console (4).

23. Device according to claim 21 wherein the adapter element (45) is equipped in the area of the attachment surface (46) with dovetail grooves or T-grooves for receiving the respective fitting rail of the tool spindle unit (10).

* * * * *